A. OLANDER.
WEED CUTTER.
APPLICATION FILED JULY 19, 1921.
1,404,313.
Patented Jan. 24, 1922.
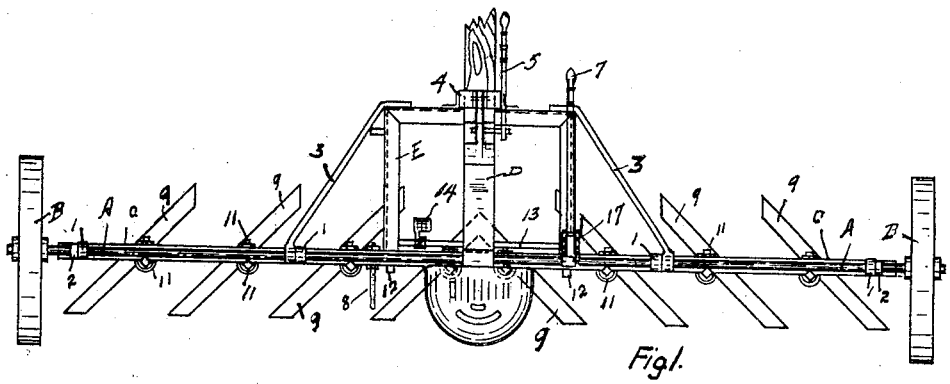
Fig. 1.
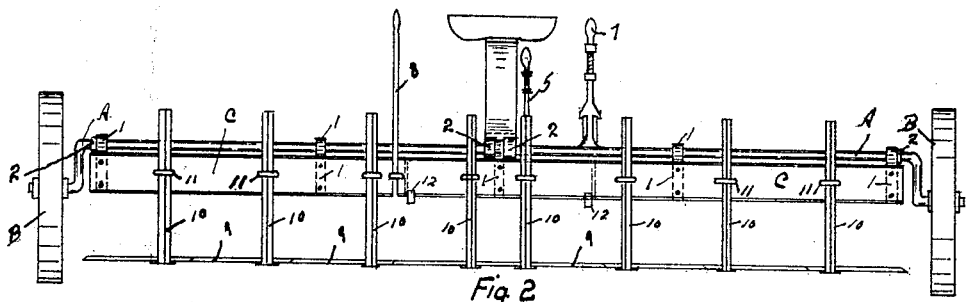
Fig. 2.
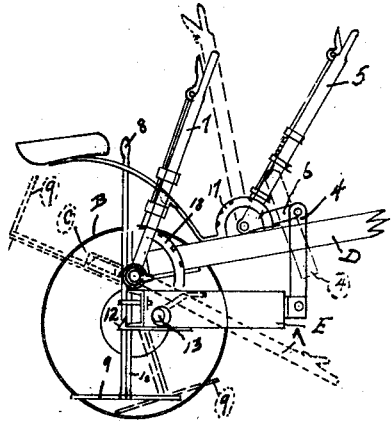
Fig. 3.
Fig. 4.
August Olander
INVENTOR
BY J. M. Thomas
ATTORNEY

UNITED STATES PATENT OFFICE.

AUGUST OLANDER, OF MURRAY, UTAH.

WEED CUTTER.

1,404,313.  Specification of Letters Patent.  Patented Jan. 24, 1922.

Application filed July 19, 1921. Serial No. 485,852.

*To all whom it may concern:*

Be it known that I, AUGUST OLANDER, a citizen of the United States, residing at Murray, in the county of Salt Lake and State of Utah, have invented certain new and useful Improvements in Weed Cutters, of which the following is a specification.

My invention relates to agricultural implements, and has for its object to provide a weed cutter by which weeds may be cut at the surface of the ground and at any depth in the soil down to two or three inches if desired, and by simple mechanical movements the machine may be adjusted or tilted for cutting weeds on hillsides and when the machine is drawn up or down hill, and it may be adjusted to have the cutting blades clear of the ground for traveling from field to field, and if weeds or other débris should catch on the cutting blades they may be tilted to clean off said débris.

These objects I accomplish with the machine illustrated in the accompanying drawings in which similar letters and numerals of reference indicate like parts throughout the several views, and as described in the specification forming a part of this application and pointed out in the appended claims.

In the drawings in which I have shown a substantial embodiment of my invention Figure 1 is a plan view of the machine. Figure 2 is an elevation of the machine looking at it from the rear. Figure 3 is a side elevation of the machine with one of the wheels removed. Figure 4 is a view in perspective of one of the cutting blades and standards.

In cutting weeds it is highly desirable to cut them as near the top of the ground as may be, and with as wide a swathe as is practical, and with the present invention this may be done with the power of two horses. The present invention consists of a U-shaped axle A mounted on two wheels B with a channel iron cross bar C journalled on said axle between said wheels by the straps 1. The said straps 1 are held from longitudinal movement on said axle by the collars 2. This construction allows the channel iron to be moved partially around said axle yet it is retained from longitudinal movement and adds strength to the axle. The tongue D is fastened to said axle by the middle one of said straps 1 and by angle braces 3, and is also held from lateral movement by the link straps 4, which are pivoted at their lower ends to the channel iron frame E, that in turn is rigidly fastened to said channel iron cross bar C. A lever 5 is fulcrumed on said tongue D and has an arm 6 integral therewith by which the front side of said frame E may be raised or lowered to tilt the cutting blades 9. The ordinary slotted segment guide 17 is used to lock said lever when the tilting has been made. The tilted position of the blades, lever 5 and arm 6 is shown in long dotted lines in Figure 3. Another lever 7 having a similar slotted segment lock 18 is fastened on the medial portion of said axle A by which said axle is partially rotated to adjust the vertical position of the machine in relation to said wheels B, in order that the cutting blades may be raised or lowered as to the surface of the soil so that the weeds may be cut at or below the surface, also in order that all parts of my machine may be raised clear of the ground except the wheels. Another lever 8 is rigidly fastened at its lower end to the said channel iron C and fulcrumed on said axle A to move said channel iron partially around said axle to dump or clean said blades of any weeds or débris which may be caught on them. The cutting blades 9 are rigidly fastened on the lower end of its particular standard 10 and are set at an angle to the travel of the machine, those used on the left hand side all pointing one direction while those on the right side are pointed at right angles thereto, and in the middle I use an A-shaped blade having two standards. The standards 10 are each individually fastened to the face of said channel iron C by eye bolts 11 passed through said channel iron with nuts screwed thereon and are easily taken off for sharpening or repairs. Each of said blades 9 is made of thin steel with one corner cut off to form a beveled cutting edge. Two flat spring dogs 12 are fastened at one end to said frame E and normally engage the rear face or edge of said channel iron to hold it normally in vertical position as shown in Figure 3. A short shaft 13 is medially fastened to one end of a foot lever 14 which is fulcrumed on said frame E, and when said foot lever is moved on its fulcrum the said shaft 13 will release both of said dogs 12 from their engagement with said channel iron and then the channel iron and its connections may be partially rotated around said axle, as in dumping said blades to clear them of weeds.

The operation of my weeder is as follows:—

The machine is set to cut at the desired depth by partially rotating the axle A by the lever 7, and the blades are given the horizontal position, as shown in Figure 3, by the lever 8 throwing the channel iron into vertical position and then locking it by releasing the lever 14 which allows said spring dogs 12 to engage said channel iron. I can shift the blades from a horizontal position to cut when going up or down hill by moving the lever 7 and raising or lowering the front edge of said frame E. Also to clear the blades of rubbish the lever 8 is moved thereby raising the blades out of the ground and to a slanting position behind the axle as shown in short dotted lines in Figure 3.

Having thus described my invention I desire to secure by Letters Patent and claim:—

1. In a weed cutter the combination of a U-shaped axle mounted on wheels; a channel iron hingedly connected with said axle; a lever to partially rotate said channel iron around said axle; a frame secured to said channel iron; spring dogs fastened at one end to said frame and adapted to engage one edge of said channel iron; a lever to disengage said dogs; another lever to raise and lower one side of said frame; cutting blades detachably secured on said channel iron; and another lever to move said axle for adjusting the vertical position of said channel iron and blades relative to the wheels.

2. A weed cutter comprising an axle, a cross brace hingedly connected with said axle; means to move said cross brace around said axle; dogs to engage said cross brace and prevent said movement; a forwardly projecting frame secured on said cross brace; a lever to adjust the front side of said frame; cutting blades mounted on said cross brace; and another lever to partially rotate said axle.

In testimony whereof I have affixed my signature.

AUGUST OLANDER.